July 3, 1962 A. SIGNORELLA 3,042,329
LIGATURE MEASURING DEVICE
Filed Sept. 19, 1960 2 Sheets-Sheet 1
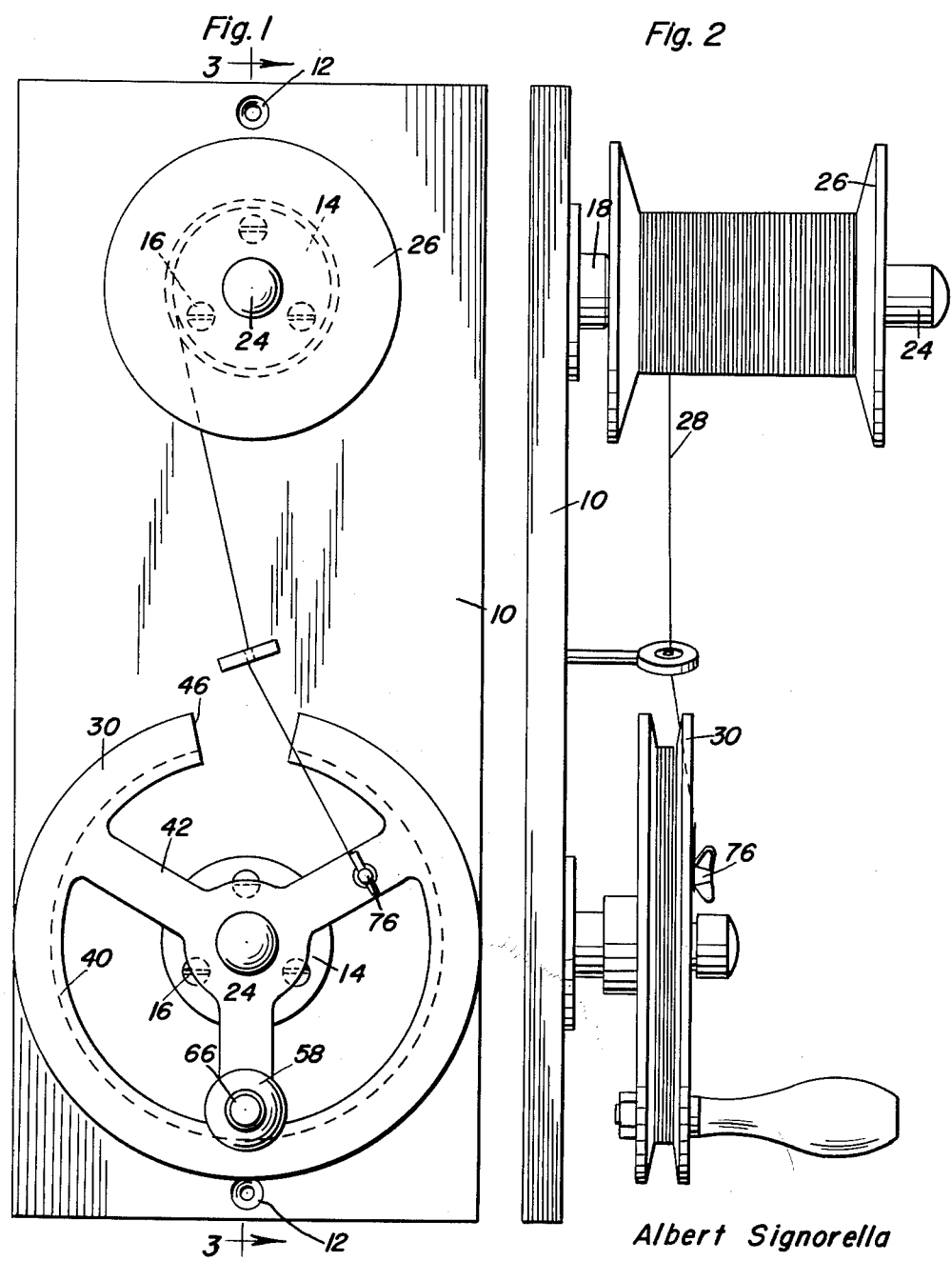
Albert Signorella
INVENTOR.

July 3, 1962

A. SIGNORELLA 3,042,329

LIGATURE MEASURING DEVICE

Filed Sept. 19, 1960

Albert Signorella
INVENTOR.

BY *Clarence A. O'Brien*
*and Harvey B. Jackson*
Attorneys

United States Patent Office 3,042,329
Patented July 3, 1962

3,042,329
LIGATURE MEASURING DEVICE
Albert Signorella, 128 Cottage St., New Bedford, Mass.
Filed Sept. 19, 1960, Ser. No. 56,905
5 Claims. (Cl. 242—48)

This invention comprises a novel and useful ligature measuring device and more particularly relates to an apparatus to simply and efficiently measure wire ligatures of a desired length for use in dental offices and for other purposes.

It is frequently desirable for the dentist or other professional persons to maintain on hand a supply of ligatures of wire or other suitable material of a specific length needed to perform a particular operation. Since ligatures are usually provided in the form of a continuous strand of wire or other material upon a spool, it is usually necessary for the operator to sever from the spool a piece of ligature of a given size. Often the need for the ligature arises when it is inconvenient to properly measure and cut the desired piece of material from the spooled strand.

It is therefore the primary object of this invention to provide a machine capable of quickly and with ease converting a spool of the ligature strand whether of wire, nylon or other material into a bundle of elements of a common predetermined length.

A further and particular object of the invention is to provide a device in accordance with the foregoing objects in which the ligature material may be withdrawn from the spool or other source, may be wound in a plurality of turns about a grooved pulley and whereby these plurality of turns may be readily severed in order to obtain the desired ligature strands of the required length.

A further object of the invention is to provide a device in accordance with the foregoing objects which will insure that the individual ligatures thus formed shall be disposed in a bundle in a compact manner ready for convenient handling rather than in a widely spread arrangement.

A still further object of the invention is to provide a device in accordance with the foregoing objects which will serve to somewhat tension and strengthen the ligature strand as the same is withdrawn from the spool and is wound upon the pulley whose circumference determines the length of the individual ligature strands.

Another object of the invention is to provide a device in accordance with the preceding objects which shall be of very simple and compact construction, may be readily assembled and disassembled.

A still further purpose of the invention is to provide a device in accordance with the foregoing object which shall make provision for very quick and easy attachment of the end of a strand of ligature to the measuring pulley in order that by merely rotating the pulley the desired number of individual ligatures may be withdrawn from the storage spool.

Still another object of the invention is to provide a device which is of such character that it may be readily mounted upon a vertical supporting surface such as a wall or the like to thereby further facilitate the convenience in the use of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of a ligature measuring device in accordance with this invention and showing the manner in which the end of a spooled ligature strand is attached to the device in preparation for measuring ligatures thereon;

FIGURE 2 is an end elevational view taken from the left side of FIGURE 1;

Figure 3:
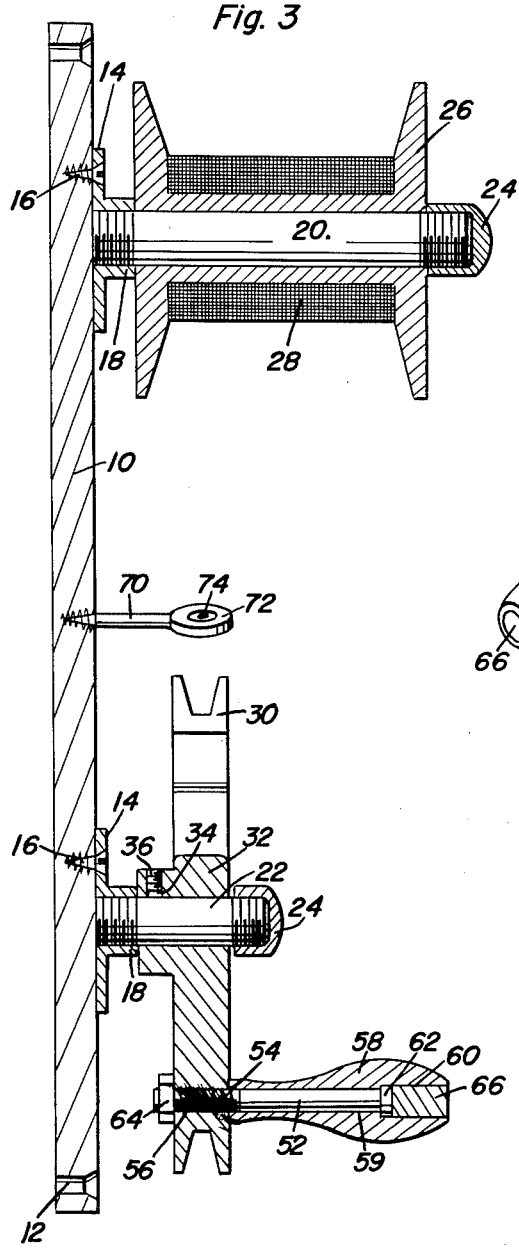
FIGURE 3 is a vertical central longitudinal sectional view taken substantially upon the plane indicated by section line 3—3 of FIGURE 1 but showing the position of the device just after a spool of ligature strand has been mounted upon the device and before the strand has been operatively connected to the measuring pulley of the device.

Referring now especially to FIGURES 1–3 it will be observed that the device in accordance with this invention includes a base 10 which may conveniently comprise a panel of wood or other suitable material which may means of apertures 12 conveniently placed thereon is adapted to be secured as by screws or other fasteners to a vertical supporting surface such as a wall or the like. Although the invention is ideally adapted for use with vertical support surfaces, it is to be understood that it may be likewise employed upon horizontal surfaces if desired.

The base 10 of a suitable and convenient size and shape is provided with a pair of mounting brackets such as the disks or plates 14 which may be detachably secured to the base as by screws 16 or other fasteners and which are mounted in an appropriately spaced relation to each other, as for example adjacent the top and bottom edges or portions of the plate as shown in FIGURES 1–3. Each of the brackets 14 are provided with an internally threaded boss 18 which thus provides internally threaded bores in which are received the threaded extremities at one end of each of a pair of axles or spindles 20 and 22. The other threaded ends of the axles or spindles are provided with internally threaded caps constituting retainers 24 by means of which a spool 26 or other suitable support means for a continuous strand of a ligature 28 may be rotatably mounted and retained thereon. It will be observed that the retainer 24 and the projecting boss 18 of the bracket member serves to securely retain and yet permit rotation of the spool 26 upon the spindle 20. In a similar manner a ligature measuring pulley 30 has its hub 32 retained upon a spindle 22.

As will be further observed from FIGURE 3, the hub 32 is preferably provided with a lubricant receiving bore 34 closed as by a setscrew 36 whereby lubricant can be conveniently supplied to the spindle 22 upon which the measuring pulley 30 is thus rotatably mounted.

It will be understood that the same manner as described in connection with the spool 26, the hub 32 of the measuring pulley 30 is retained between the projecting boss 18 and retainer 24 so as to likewise prevent axial movement but permit radial rotation.

Figure 4:
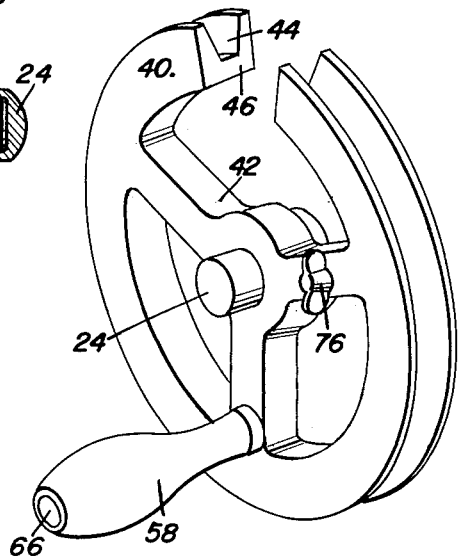
FIGURE 4 is a perspective view of the measuring pulley of the device.

Referring now particularly to FIGURES 1 and 4 it will be observed that the measuring pulley 30 in addition to the hub 32 includes a peripherally disposed rim 40 which is connected to the hub by a plurality of spokes 42. If desired, the spokes 42 may be recessed or cutaway so as to lighten the same. The periphery of the rim is provided with a peripheral channel or groove 44 which is adapted to receive therein a plurality of turns of the continuous ligature strand 28 as supplied from the ligature support means 26.

Figure 5:
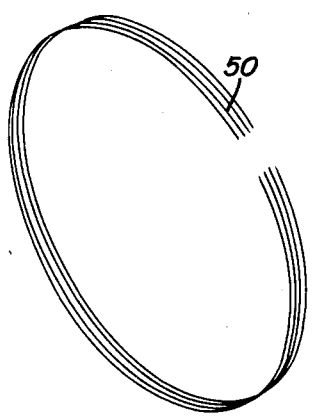
FIGURE 5 is a perspective view showing a bundle of ligatures after the same has been formed upon the measuring pulley and have been removed therefrom.

At a suitable location the hub is provided with a slot as indicated at 46 in FIGURES 4 and 1, which slot is preferably disposed midway between two adjacent spokes 42. This slot is provided in order to afford sufficient clearance to enable a knife or other cutting means to be passed through the rim of the pulley and thus sever the plurality of turns which are disposed in the channel or groove 44 after rotation of the pulley. When this occurs, the plurality of strands as shown in FIGURE 5 and as designated generally by the numeral 50 are disposed in a bundle or group and constitute strands of uniform predetermined length which thus may be removed and are ready for use. It will be understood that the circumference of the pulley will be so selected as to provide the turns of a given length and thus afford strands of a desired length.

When it is desired to use the device to form ligatures of a different length, either the pulley may be readily removed from its support spindle 22 and replaced by a pulley of different size having a circumference of the requisite length, or any suitable adjusting means may be applied to the pulley such as adapter attachments which will increase the diameter and hence the circumference of the peripheral groove of the pulley.

In order to impart rotation to the pulley, there is provided a handle assembly consisting of a pintle 52, see FIGURE 5, having an externally threaded extremity 54 engaged in a corresponding bore 56 formed in one of the spokes 42 adjacent the rim 40. A handle 58 is secured upon the pintle 52, this handle having an axial bore 59 receiving the pintle and a counterbore 60 for the headed extremity 62 of the pintle. In some instances this pintle may consist of a conventional screw having a nut 64 by which it is secured to the pulley. A plut 66 is provided for the counterbore to thus enclose and conceal the headed extremities of the retaining pintle.

A guide means consisting of an eye screw 70 and having an apertured head or eye 72 thereon is secured to the base 10 between the spindles 20 and 22. A replaceable bushing of nylon or other suitable material 74 is disposed in the eye 72 and provides a guide aperture through which the strand 28 is extended. This guide serves to maintain the strand in proper disposition relative to the spool 26 and the pulley 30, so as to somewhat tension the strand as the same is drawn from the spool and wound upon the pulley and also serves to direct the strand such that it may be caused to pass into the channel 44 during rotation of the pulley.

A fastener is provided for readily and detachably securing the end of the strand 28 to the pulley in preparation for winding of the strand upon the pulley. Thus, there is provided a wing nut 76 of any suitable character which is preferably threadedly engaged in a bore in one of the spokes 42 of the pulley adjacent the slot 46 and adjacent the rim of the pulley. The end of the strand is readily secured to the wing nut and tightened to thereby secure the strand to the pulley so that upon rotation of the pulley the strand will be caused to form turns in the peripheral channel of the pulley as previously mentioned.

It is desired to point out that with this arrangement any desired number of turns of the continuous ligature strand can be wound upon the pulley so that they may all be simultaneously cut and severed and thus provide ligature ties of a uniform desired length. This results in the formed ligatures being positioned in a compact bundle as suggested in FIGURE 5 and renders for easy removal or storage and handling after their formation.

It is desired to note that the spindle 20 can be of such length that it will handle any desired length of spools 26 in which the ligatures may be supplied, it being understood that suitable spacers can be provided between the spool and the boss 18 or the retainer 24 or both in order to take up axial movement therebetween.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for forming ligatures of a uniform length from a continuous ligature strand comprising a base, support means on said base for receiving a continuous ligature strand, a flat ligature measuring pulley rotatably mounted on said base in a spaced relation to said support means, a clamp screw provided at one side of said pulley for releasably fastening an end of a continuous ligature strand thereto, said pulley having a rim with a peripheral channel therein for receiving a plurality of turns of the ligature strand, said pulley also having an open slot extending transversely through said rim and channel of said pulley to enable passage of a cutting device therethrough whereby to sever said plurality of turns and form therefrom a bundle of ligatures of uniform lengths, said base having an axle projecting therefrom, said pulley having a hub movably received on said axle, and spaced spokes connecting said hub to said rim, said slot being disposed intermediate a pair of adjacent spokes and said clamp screw being provided on one of said adjacent spokes.

2. The combination of claim 1 including a rigid guide fixedly mounted on said base and disposed between said support means and said pulley, said guide being positioned to direct said continuous strand into said peripheral channel.

3. The device as defined in claim 2 wherein said guide comprises a screw eye secured to said base.

4. The device as defined in claim 2 wherein said guide comprises a screw eye secured to said base, and a wear-resistant eyelet provided in the eye of said screw eye.

5. In an apparatus for measuring and cutting ligatures of a uniform length, the combination of a base, a stub shaft secured to and projecting from said base, a pulley having a hub rotatably mounted on said stub shaft, said pulley also having a rim provided with a circumferential groove and a plurality of circumferentially spaced spokes connecting said rim to said hub, the rim of said pulley being provided at a point between two adjacent spokes with an open recess completely severing said rim and communicating with the space between said adjacent spokes whereby to facilitate placing of a ligature in said groove of the pulley and subsequent cutting thereof, and a ligature clamping screw provided at one side of the pulley on one of said adjacent spokes.

References Cited in the file of this patent

UNITED STATES PATENTS

| | | |
|---|---|---|
| 1,511,356 | Morse | Oct. 14, 1924 |
| 1,564,985 | Stomberg | Dec. 8, 1925 |
| 1,852,079 | Hescock | Apr. 5, 1932 |
| 2,052,711 | Jennings | Sept. 1, 1936 |
| 2,208,774 | Pierson | July 23, 1940 |
| 2,397,087 | Camras | Mar. 26, 1946 |
| 2,434,227 | Rowe | Jan. 6, 1948 |
| 2,574,364 | Worsham | Nov. 6, 1951 |
| 2,760,570 | Reckhow | Aug. 28, 1956 |
| 2,819,760 | Norehad | Jan. 14, 1958 |
| 2,920,834 | Robinson | Jan. 12, 1960 |